June 21, 1966 R. B. HANKIN ETAL 3,257,614
FREQUENCY MEASURING UTILIZING REFLECTED WAVES
Filed Dec. 17, 1962
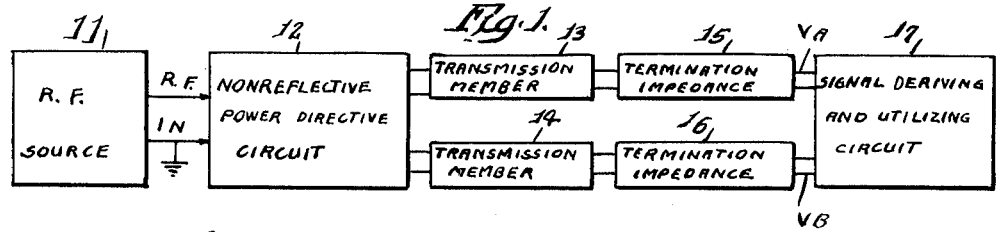
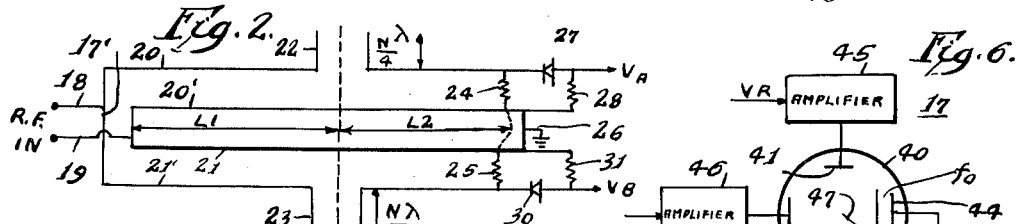
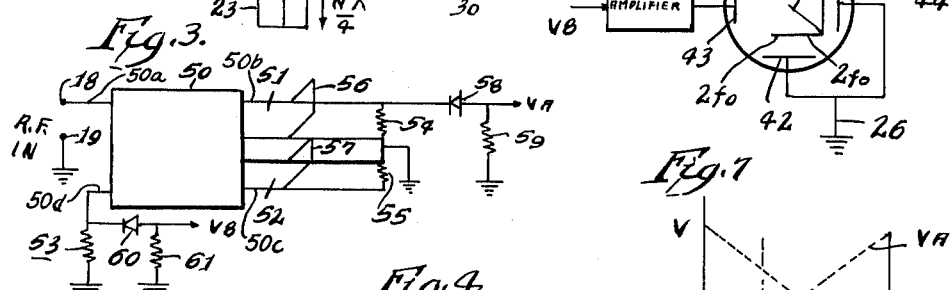
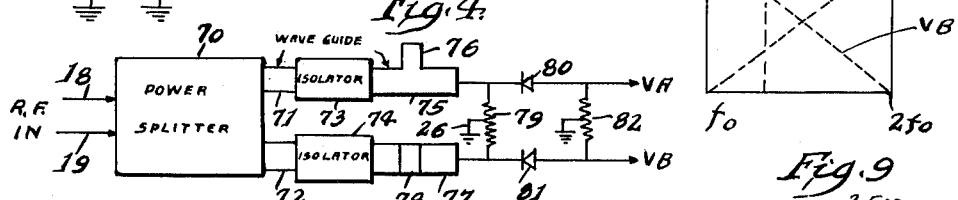
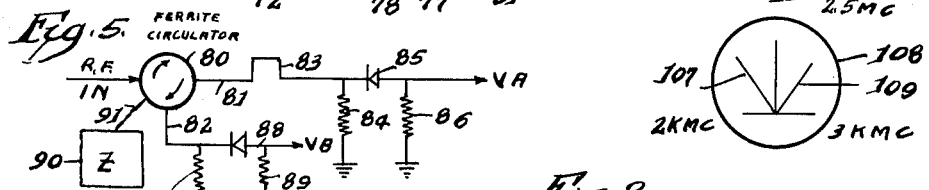
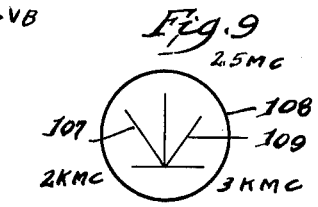
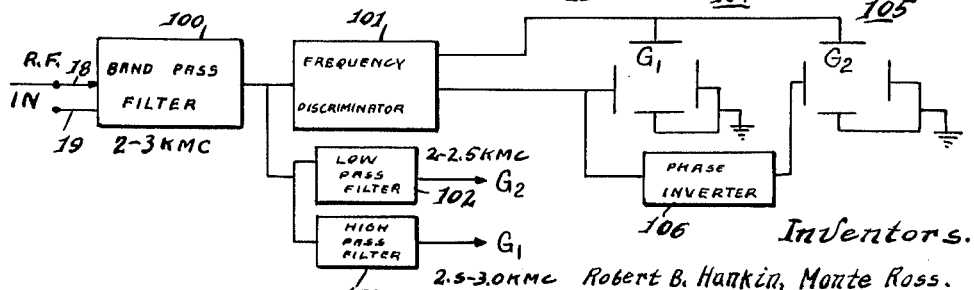
Inventors.
Robert B. Hankin, Monte Ross.
& Alva C. Todd.
By Hofgren, Brady, Wegner, Allen & Stellman
Attorneys.

United States Patent Office 3,257,614
Patented June 21, 1966

1

3,257,614
FREQUENCY MEASURING UTILIZING
REFLECTED WAVES
Robert B. Hankin and Monte Ross, Chicago, and Alva
C. Todd, Villa Park, Ill., assignors to The Hallicrafters
Co., a corporation of Delaware
Filed Dec. 17, 1962, Ser. No. 245,040
6 Claims. (Cl. 324—78)

This invention relates to a frequency discriminator and more specifically to a device which measures the frequency of received radio frequency signals and produces a readily usable display representative of the frequency.

At the present time, frequencies of operation in the thousands of megacycles are common, for example, in radar and other counter-measures equipment. Previous methods of performing frequency measurements on received signals in this frequency range have demanded extremely expensive, complicated and cumbersome equipment.

It is an object of this invention to provide an improved wide band frequency discriminator for measuring frequencies of received signals.

It is a further object of the invention to provide a light-weight, small frequency discriminator that is particularly adapted for portable use.

It is yet another object of this invention to provide low-cost equipment for measuring frequencies of received signals with a high degree of accuracy.

Still a further object of the invention is to provide a frequency discriminator with a high degree of resolution and low tangential sensitivity.

One feature of the invention is to provide a frequency discriminator for measuring signals received from a source of signals comprising means coupled to a source for directing the signals in a predetermined manner; an energy transmission member having a predetermined irregularity formed therein coupled to the directing means for receiving a portion of the signals; an impedance means terminating the transmission member; means coupled to the impedance means for deriving a signal representative of the frequency of the received signals and means coupled to the directing means for preventing signals from being reflected to the source.

A further feature of the invention is to provide a frequency discriminator having a pair of transmission members having predetermined irregularities formed therein respectively.

Yet another feature of the invention is to provide a discriminator having a non-reflective power directing circuit coupled to a pair of transmission members one of which includes a shorted stub and the other includes an open stub formed therein.

Still a further feature of the invention is the provision of a hybrid coupler joining a source of radio frequency signals to a pair of transmission members having shorted stubs formed therein and terminating impedances matching the characteristic impedance of the transmission members.

It is yet a further feature of the invention to provide a power splitter coupled to a source of radio frequency energy having a first wave guide coupled to the splitter through a first isolator with a shorting stub on the narrow face of the wave guide and a second wave guide coupled to the splitter through a second isolator and having a shorted stub formed on the broad side of the wave guide.

It is still a further feature of the invention to provide a ferrite circulator coupled to a source of radio frequency signals having a transmission member coupled thereto having formed therein a shorted stub wherein said transmission member is terminated in an impedance which matches the characteristic impedance of the line.

And yet, a further feature is the provision of a novel display device incorporating a cathode ray tube having a pair of electron guns, a pass band filter arrangement and a frequency discriminator such that the resolution of the signal is improved.

Further features and advantages of the invention will readily be apparent from the following specification and from the drawings in which:

FIGURE 1 is a block diagram illustrating the invention;

FIGURE 2 is a schematic diagram of an embodiment of the invention utilizing the pair of transmission lines coupled to a source of radio frequency power;

FIGURE 3 is a schematic diagram of another embodiment of the invention utilizing a hybrid coupler joined to a pair of transmission lines;

FIGURE 4 is a schematic diagram of a further embodiment of the invention having a power splitter and a pair of isolators coupled to a pair of wave guide sections;

FIGURE 5 is a schematic diagram of an embodiment of the invention wherein a ferrite circulator is utilized to direct the signal;

FIGURE 6 schematically shows one form of display device utilizable with the invention;

FIGURE 7 is a graph showing the idealized operating characteristics of the discriminator;

FIGURE 8 schematically shows a second form of display device usable with the invention; and FIGURE 9 shows a representative display achieved with the device of FIGURE 8.

Referring now to FIGURE 1, a source of radio frequency signals 11 is coupled by a pair of leads to a non-reflective power directive circuit 12. A pair of transmission members 13 and 14 joined to the output of circuit 12 are terminated respectively by a pair of terminating impedances 15 and 16. The signal deriving and utilizing circuit 17 coupled to the termination impedances completes the circuit.

Operation of the discriminator of FIGURE 1 is as follows: the radio frequency source, which may be a radio receiver, an oscillator or other electronic equipment which puts out a signal in the frequency range for which the discriminator is designed, produces a signal which is fed to the non-reflective power directive circuit 12. Therein the signal is directed to the transmission members 13 and 14 and the signal is divided with part of the power going to one member and part to the other. Formed in the transmission members are a pair of irregularities which have predetermined impedance characteristics to be described hereinafter. Briefly, the impedances of the transmission members are functions of frequency, the impedance of one member varying directly and the other inversely with frequency. Signals are developed across the termination impedances 15 and 16 which bear a relationship to the ability of the transmission members to pass the signals. The signal deriving and utilizing circuit 17 takes the signals developed across the termination members and produces a usable signal for indicating the frequency of the received signal.

The idealized response of the two transmission members 13, 14 is shown in FIGURE 7 in which the horizontal axis represents frequency and the vertical axis represents voltage. The line $V_A$ and $V_B$ represent the voltages developed across the termination impedances 15, 16, respectively, at any predetermined frequency between $f_0$ and $2f_0$.

Referring now to FIGURE 6 there is shown a signal deriving and utilizing circuit 17 usable with the device of FIGURE 1 including the face of a cathode ray tube 40, a pair of vertical deflection plates 41, 42 and a pair of horizontal deflection plates 43, 44. Plates 42, 44 are grounded through contacts 26 and plates 41, 43 are coupled through a pair of amplifiers 45, 46 to receive signals $V_A$ and $V_B$, the outputs from the termination impedances 15, 16 of FIG. 1. Assuming that a signal is being received, which is at the lower end of the range for which the equipment is designed designated by the symbol $f_o$, the transmission member 13 passes substantially all of the signal that it receives to the terminating impedance 15. Transmission member 14 acts as an open circuit, and none of the signal which it receives is developed across termination impedance 16. Thus, amplifier 45 receives a signal which produces a vertical deflection of the electron beam while amplifier 46 has substantially no output and the trace appearing on the face of the cathode ray tube is a vertical line designated as $f_o$. If a higher frequency signal is received, between $f_o$ and $2f_o$, each of the amplifiers develops an output and a signal is developed as represented by line 47. As the frequency of received signal increases the line 47 rotates about its origin in a counterclockwise direction so that the angle between it and the vertical line is an indication of the frequency of received signal. The length of the line 47 is an approximation of the power or strength of the received signal.

Referring now to FIGURE 2 wherein an embodiment of the invention is shown, the non-reflective power directive circuit 12 includes a T connection 17' coupled to terminals 18 and 19 for receiving a radio frequency signal. A pair of transmission lines 20, 20' and 21, 21', in this case strip line, are coupled to T 17'. Formed in line 20 is a predetermined irregularity or open stub 22 and there is a predetermined irregularity 23 consisting of a shorted stub formed in line 21' of the other transmission line. A pair of impedances 24, 25 terminates each of the lines 20, 20' and 21, 21'. The lower end of impedance 24, the upper end of impedance 25, and lines 20' and 21 are grounded at 26. A first detector circuit consisting of a diode 27 and a resistor 28 is coupled across impedance 24 while a second detector circuit consisting of a diode 30 and a resistance 31 is coupled across impedance 25.

Open stub 22 and shorted stub 23 have predetermined lengths designated by $N\lambda/4$, where $\lambda$ is equal to the wave length of lowest frequency received signal and N is an integer, and are spaced a predetermined distance $L_1$ from the T 17'. Impedances 24 and 25 are spaced from the stubs 22 and 23 a predetermined distance $L_2$ and in the embodiment shown $L_1$ is equal to $L_2$. Resistances 24 and 25 have values equivalent to the characteristic impedances of the respective lines.

If the lengths of the line comprising the short circuit and the open circuit are identical, and also of the same characteristics impedance and they are terminated in a resistance equal to the characteristic impedance of the lines, then the ratio of $V_A$ and $V_B$ will uniquely define a particular frequency if a particular frequency has been fed into the T section. The frequency range over which the uniqueness of frequency may be defined is determined by the lengths of the shorted and open stubs of the line.

If, for instance, N=1 and $\lambda_o$ is the wave length of the lowest frequency, $f_o$, to be discriminated, then the ratio $V_A$ out to $V_B$ out will be unique from $f_o$ to $2f_o$ or an octave. If N is greater than 1, that is 2, 3, etc., then the frequency range will be smaller.

Assuming that a signal is being received across terminals 18, 19 of FIGURE 2 which is at the lower end of the frequency range for which the equipment is designed designated by the symbol $f_o$ which has a predetermined wave length $\lambda$, stub 22 acts as a short circuit and all of the power in the lines 20, 20' is developed across resistor 24, diode 27 and resistor 28 rectify the alternating signal and an output $V_A$ is developed. With this frequency received stub 23 acts as an open circuit and zero voltage is developed across resistor 25, hence no signal is produced and $B_B$ equals zero. These signals are supplied to the amplifiers 45 and 46 respectively, and a vertical sweep is developed designated by line $f_o$ on the face of tube 40, FIGURE 6. If a higher frequency is received the stubs 22 and 23 respectively pass different portions of the signal and the resulting voltages which appear across the resistors 24, 25 are rectified, and appear as outputs $V_A$ and $V_B$. If the highest signal for which the circuit is designed is one octave above $f_o$ or $2f_o$, then when this signal is received, stub 22 acts as an open circuit since it is now a half wave length and stub 23 acts as a short circuit and the only voltage developed is across resistor 25. This is portrayed as the line $2f_o$ on the cathode ray tube 40. It is apparent that any inbetween signal will appear as a line 47 on the scope. Thus, a visual display is presented which allows an observer to read the frequency of received signal.

FIGURE 3 shows a second embodiment of the invention wherein there is provided an RF input across terminals 18, 19 feeding a first or input terminal 50a of a hybrid coupler 50 which has a pair of lines 51 and 52 coupled to second and third terminals 50b and 50c and has an additional output circuit designated as 53 connected with fourth terminal 50d. A pair of resistances 54, 55 terminates the lines 51 and 52 and are matched to the impedance of the lines. The pair of shorted stubs 56 and 57 form predetermined irregularities in lines 51 and 52. A diode 58 and resistor 59 are provided for developing a rectified signal $V_A$ and a second diode 60 and resistor 61 provides means for rectifying a second signal designated as $V_B$.

The hybrid coupler 50 serves as a power directive circuit. Since the stubs 56, 57 are in shunt with the lines, when the frequency of received signal is such that the stubs are equivalent to $\lambda/4$ in length, all the input signal at first terminal 50a is transmitted to the termination impedances 54, 55 after being equally divided and phase shifted by the coupler 50. At the frequency where the stubs are $\lambda/2$ in length, the stubs appear as short circuits across the lines 51, 52 and all the signals in the lines are reflected. Due to the phase shift characteristics of the hybrid coupler 50, none of the signal is returned to the input terminal 50a, but all of it is reflected to fourth terminal 50d and output circuit 53. Thus, this embodiment also provides a circuit whereby a pair of signals are developed depending upon the frequency of received signals which may be applied to the amplifiers 45, 46 of FIGURE 6 and produce a similar display in the cathode ray tube 40 as previously described.

FIGURE 4 shows another embodiment of the invention wherein a power splitter 70 is provided for receiving an RF input across terminals 18 and 19 which feeds the signal to a pair of wave guide sections 71, 72. Coupled individually thereto are a pair of isolators 73, 74 which serve to prevent energy from being reflected back into the power splitter 70 and hence into the RF input or the other wave guide section. Wave guide section 75 coupled to isolator 73 has a shorted stub 76 formed on the narrow wall thereof and wave guide section 77 connected to isolator 74 has a shorted stub 78 formed on its broad face wall. The wave guides are terminated in their characteristic impedances 79. Detectors 80 and 81 and resistor 82 are provided for developing signals $V_A$ and $V_B$.

The operation of this embodiment is similar to that of the previously discussed embodiments. The shorted stubs 76, 78 are utilized in this device, one on the narrower wall and the other on the broad wall of wave guide sections, since in wave guide construction it is not advisable to have open stubs which might allow radio frequency energy to leave the system and upset other equipment.

These stubs act as predetermined irregularities which give the lines predetermined pass band characteristics. The isolators 73, 74 prevent energy from being reflected back into the power splitter. At the lower end of the operating range of this embodiment guide 75 passes all of the energy it receives to the resistor 79 and signal $V_A$ is developed. At a frequency of $2f_o$ all of the energy supplied to guide 75 is reflected by stub 76 and hence absorbed by isolator 73 and an output of zero voltage is developed at $V_A$. Conversely at the low end of the range isolator 74 absorbs all of the energy it receives and none goes to resistor 79 while at the upper end of the range stub 78 acts as a shorted stub and a signal $V_B$ is developed. At some point intermediate to frequencies $f_o$ and $2f_o$ signals are developed at both $V_A$ and $V_B$ and a display is shown on the tube 40 in FIGURE 6.

Yet another embodiment of the invention as shown in FIGURE 5 is presented wherein a ferrite circulator 80 is provided with input terminals for receiving an RF signal input. A terminal is coupled to line 81, which serves to develop signals $V_A$. Line 81 has a shorted stub 83 formed therein which provides a predetermined irregularity and this line is terminated in its characteristic impedance by a resistance 84. The diode 85 and resistor 86 serve the function of rectifying an alternating current signal to develop a direct current signal $V_A$ which is supplied to amplifier 45 of FIGURE 6. Line 82 is terminated in its characteristic impedance by a resistor 87 and diode 88 and resistor 89 serve the previously described function of rectifying and producing a signal $V_B$.

If at frequency $f_o$, shorted stub 83 appears as an open circuit, all of the energy is reflected to the circulator and passes to line 82, providing a maximum signal, $V_B$. At $2f_o$, stub 83 is a short circuit and all of the energy is used to develop $V_A$. At intermediate frequencies, signals will appear at both outputs. The dashed lines 90 represent an optional impedance which may be coupled through line 91 to the ferrite circulator at a point between line 82 and the input to absorb any energy which might be reflected from line 82 due to irregularities in equipment and prevents any energy from being reflected back to the RF source.

FIGURES 8 and 9 show a second form of display device usable with the frequency discriminators of the discussed embodiments and in which the display has been converted from a 90° sweep as in FIGURE 6, to a 180° sweep, illustrated in FIGURE 9. The device includes a band pass filter circuit 100 receiving an RF signal across input terminals 18, 19 and feeding a first portion of the signal received to the frequency discriminator 101 and a second portion to low pass filter 102 and high pass filter 103. These filters 102 and 103 serve to provide gate signals for a two-gun cathode ray tube schematically shown in FIGURE 9 having a first gun 104 and a second gun 105. Assuming that the discriminator is designed to operate in the range from 2,000 megacycles to 3,000 megacycles, gate 102 is designed to pass frequencies in the range of 2,000 to 2,500 megacycles and will develop a signal which turns on electron gun 104 when signals in this range are received. In a like manner filter 103 passes signals in the range of 2,500 to 3,000 megacycles and gates electron gun 105 on during receipt of these signals. The frequency discriminator 101 passes signals between 2,000 and 3,000 megacycles. A phase inverter 106 completes the circuit.

In operation when a signal is received in the lower range of the discriminator electron gun 104 is turned on and the signal is developed between the horizontal and vertical deflection plates of the gun 104. Depending upon the frequency as above described in the operation of the discriminators of FIGURES 2, 3, 4, and 5 a pair of signals are developed of predetermined magnitudes such that a line of 107 appears on the face of the two gun tube 108 of FIGURE 9. In the event that the signal is of the higher frequency, that is, above 2,500 megacycles, gun 105 is gated on by filter 103 and a signal is developed by gun 105. The phase inverter reverses the polarity of the horizontal deflection signal so that a line 109 appears in the right-hand portion of the scope giving an indication of the frequency received signal.

While we have shown and described embodiments of our invention, it is to be understood that it is capable of many modifications. Changes, therefore, in the construction and arrangement may be made without departing from the spirit and scope of the invention as defined in the appended claims.

What is claimed is:

1. A frequency discriminator for measuring the frequency of a signal received from a source, comprising: a T-connector having an input connected with said source and a pair of outputs; a twin line transmission member connected with one of said outputs and having a first stub section connected therewith; a second twin line transmission member connected with the other of said outputs and having a second stub section connected in series therein, said first and second stub sections having complementary transmission characteristics, the length of said twin line transmission members from said T-connector outputs to said stubs being the same; terminating impedances connected with each of said lines and having an impedance equal to the characteristic impedance of the lines; means coupled to said impedances for deriving signals representative of the signals passed by said transmission lines; and means for displaying a ratio of said signals representative of the frequency of the signal from said source.

2. A frequency discriminator for measuring the frequency of a signal received from a source, comprising: a T-connector having an input connected with said source and a pair of outputs; a twin line transmission member connected with one of said outputs and having a shorted stub in series therein; a second twin line transmission member connected with the other of said outputs and having an open stub connected in series therein, the length of said twin line transmission members from said T-connector outputs to said stubs being the same; terminating impedances connected with each of said lines and having an impedance equal to the characteristic impedance of the lines; means coupled to said impedances for deriving signals representative of the signals passed by said transmission lines; and means for displaying a ratio of said signals representative of the frequency of the signal from said source.

3. The frequency discriminator of claim 2 wherein the length of the transmission members between said T-connector and said stubs and between the stubs and the terminating impedances are all the same.

4. A frequency discriminator for measuring the frequency of the signal received from a source, comprising: a ferrite circulator having an input connected with said source and having a pair of outputs, energy reflected from the load connected with the first of said outputs being coupled through said circulator to the other output; an energy transmission member connected with said first output and having a reactive element connected therein; a first impedance connected with and terminating said member, said reactive element being between the circulator and the terminating impedance; a second impedance connected with and terminating the other output of said circulator; means coupled to each of said impedances for deriving two signals each representative of the energy coupled to one of said impedances and means for displaying a ratio of said two signals, representative of the frequency of the signal from said source.

5. The frequency discriminator of claim 4 wherein said circulator has a third output between the second output and the input, to which energy reflected from the load connected to the second output is coupled, and an impedance connected with said third output for absorbing such reflected energy preventing it from reaching the input of the circulator.

6. A frequency discriminator for measuring the frequency of a signal received from a source, comprising: a four-terminal hybrid coupler having first, second, third and fourth terminals, input energy being divided and coupled to said second and third terminals, energy reflected to said second and third terminals being coupled to said fourth terminal, said first terminal being connected with said source; a pair of identical energy transmission members connected with the second and third terminals of said coupler and each having a reactive section located at an intermediate point therein; impedances having a value equal to the characteristic impedance of said members terminating each of the members; an output circuit connected with the fourth terminal of said coupler for receiving the energy reflected to said second and third terminals; an impedance connected with the output circuit and the fourth terminal; means for deriving, from the impedance terminating one of said members and from the impedance connected with said output circuit, individual signals representative respectively of the energy transmitted and reflected by said members; and means for displaying a ratio of said derived signals representative of the frequency of the signal from said source.

References Cited by the Examiner

UNITED STATES PATENTS

| | | | |
|---|---|---|---|
| 2,510,021 | 5/1950 | Korman et al. | 333—73 |
| 2,541,067 | 2/1951 | Jaynes | 324—82 |
| 2,576,249 | 11/1951 | Barney | 324—78 |
| 2,580,968 | 1/1952 | Sproull | 324—58 |
| 2,596,288 | 5/1952 | Robertson | 324—58 |
| 2,617,963 | 11/1952 | Arditi | 315—8.6 |
| 2,747,184 | 5/1956 | Kock | 333—73 |
| 2,918,600 | 12/1959 | Pensak | 315—8.6 |
| 3,039,054 | 6/1962 | Hadley | 324—82 |
| 3,114,119 | 12/1963 | Torgow | 333—11 |

WALTER L. CARLSON, *Primary Examiner.*

P. F. WILLE, *Assistant Examiner.*